United States Patent
Kitano et al.

(10) Patent No.: US 10,191,760 B2
(45) Date of Patent: Jan. 29, 2019

(54) PROXY RESPONSE PROGRAM, PROXY RESPONSE DEVICE AND PROXY RESPONSE METHOD

(71) Applicant: FUJITSU LIMITED, Kawasaki-shi, Kanagawa (JP)

(72) Inventors: Kazuma Kitano, Numazu (JP); Yosuke Kondo, Numazu (JP); Ryo Shimizu, Numazu (JP); Satoshi Oyu, Numazu (JP); Tomoaki Masuda, Numazu (JP)

(73) Assignee: Fujitsu Limited, Kawasaki (JP)

( * ) Notice: Subject to any disclaimer, the term of this patent is extended or adjusted under 35 U.S.C. 154(b) by 271 days.

(21) Appl. No.: 15/214,537

(22) Filed: Jul. 20, 2016

(65) Prior Publication Data

US 2017/0039083 A1 Feb. 9, 2017

(30) Foreign Application Priority Data

Aug. 3, 2015 (JP) .................................. 2015-153247

(51) Int. Cl.
| | |
|---|---|
| *G06F 9/50* | (2006.01) |
| *G06F 9/445* | (2018.01) |
| *G06F 9/455* | (2018.01) |
| *H04L 29/08* | (2006.01) |

(52) U.S. Cl.
CPC ............ *G06F 9/45558* (2013.01); *G06F 9/50* (2013.01); *H04L 67/28* (2013.01); *H04L 67/2814* (2013.01); *H04L 67/2833* (2013.01); *H04L 67/2842* (2013.01); *G06F 9/44505* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,361,145 B1* | 6/2016 | Wilson | ............... G06F 9/45558 |
| 2011/0307887 A1* | 12/2011 | Huang | .................. G06F 1/3228 |
| | | | 718/1 |

FOREIGN PATENT DOCUMENTS

| | | |
|---|---|---|
| JP | 2010-224914 | 10/2010 |
| JP | 2012-243096 | 12/2012 |

* cited by examiner

*Primary Examiner* — Qing Yuan Wu
(74) *Attorney, Agent, or Firm* — Fujitsu Patent Center

(57) ABSTRACT

A non-transitory computer-readable storage medium storing therein a proxy response program that causes a computer to execute a process includes requesting suspension or pausing of a virtual machine when an idle state of the virtual machine is detected, changing, when the virtual machine is suspended or paused, settings information of a communication control device between a terminal device and the virtual machine, so as to transfer access from the terminal device to the virtual machine, to the computer; sending, when the access to the virtual machine that is suspended or paused is transferred, a response to the terminal device on the basis of communication response settings information relating to a communication response to the terminal device by the virtual machine that is suspended or paused; and requesting resumption of the virtual machine that is suspended or paused in response to the transfer of the access.

11 Claims, 13 Drawing Sheets

FIG.8

VIRTUAL MACHINE MANAGEMENT TABLE TBL1

| VM_ID | IP ADDRESS | STATE |
|---|---|---|
| VM03 | IP03 | ACTIVE |
| VM04 | IP04 | ACTIVE |
| VM05 | IP05 | SUSPENDED |
| .. | .. | .. |

ACTIVE VIRTUAL MACHINE MANAGEMENT TABLE TBL2

| ACTIVE VM_ID | VM_ID | IP ADDRESS | STATE |
|---|---|---|---|
| A00001 | VM04 | IP04 | ACTIVE |
| A00002 | VM05 | IP05 | ACTIVE |
| .. | | | .. |

SUSPENDED VIRTUAL MACHINE MANAGEMENT TABLE TBL3

| SUSPENDED VM_ID | VM_ID | IP ADDRESS | STATE |
|---|---|---|---|
| S00003 | VM03 | IP03 | SUSPENDED |
| S00004 | VM06 | IP06 | SUSPENDED |
| .. | | | .. |

FIG.9

COMMUNICATION RESPONSE SETTINGS MANAGEMENT TABLE TBL4

| SUSPEND VM_ID | VM_ID | IP ADDRESS | MAC ADDRESS | TCP ACCESS SETTING | HTTP ACCESS SETTING | APPLICATION SETTING |
|---|---|---|---|---|---|---|
| S0003 | VM03 | IP001 IP002 | MAC03 | 1:INPUT,8080,ACCEPT 2:INPUT,*,DROP | 1: Location=URL1/, Auth=None GET 2: Location=URL2/Jenkins, Auth=BASIC, User=admin, Password=***** POST/DATA2 | 1:"200 OK" 2:"202 Accepted",DATA2: 1: name=job001 enable=true 2: name=job002 enable=false |
| S0004 | VM04 | IP001 IP002 | MAC04 | ------- | ------- | ------- |

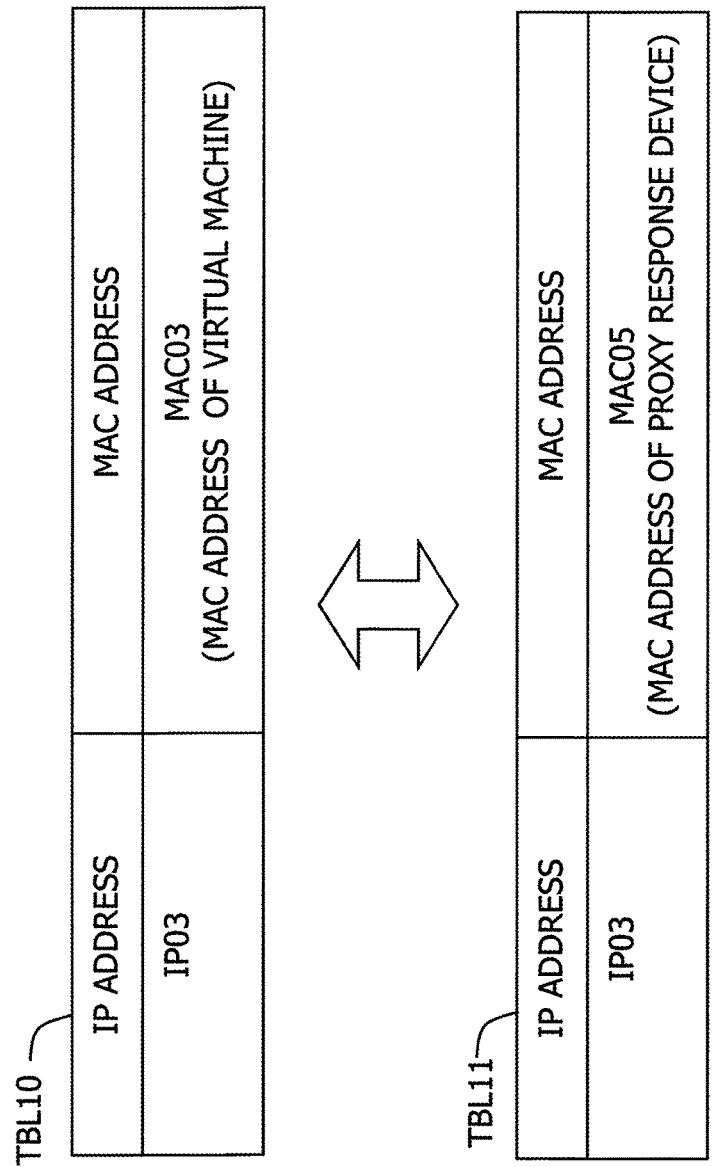

FIG.11

PK1:
- IP: TRANSMISSION SOURCE:IP002 / TRANSMISSION DESTINATION:IP03
- TCP: TRANSMISSION SOURCE: 67883 / TRANSMISSION DESTINATION:8080
- HTTP: URL1, GET

PK2:
- IP: TRANSMISSION SOURCE:IP002 / TRANSMISSION DESTINATION:IP03
- TCP: TRANSMISSION SOURCE: 67883 / TRANSMISSION DESTINATION:8080
- HTTP: URL2/Jenkins, Auth=BASIC, User=Admin, PW=*****, POST/DATA2(job001)

FIG.13

CONNECTION INFORMATION MANAGEMENT TABLE TBL5

| CONNECTION ID | VM_ID | TRANSMISSION SOURCE IP ADDRESS | TRANSMISSION DESTINATION IP ADDRESS | TRANSMISSION SOURCE PORT NUMBER | TRANSMISSION DESTINATION PORT NUMBER | PROTOCOL TYPE | CONNECTION STATE | RESPONSE STATE |
|---|---|---|---|---|---|---|---|---|
| C00001 | VM03 | IP001 | IP03 | 56375 | 8080 | TCP | DISCONNECTED | RESPONDED |
| C00002 | VM03 | IP002 | IP03 | 67883 | 8080 | TCP | RECEIVING | NOT RESPONDED |
| .. | .. | .. | .. | .. | .. | .. | .. | .. |

PROXY RECEPTION DATA MANAGEMENT TBL6

| RECEPTION DATA ID | VM_ID | CONNECTION ID | RECEPTION TIMING | PROTOCOL TYPE | URL | AUTHENTICATION DATA | RECEPTION DATA | RESPONSE DATA |
|---|---|---|---|---|---|---|---|---|
| D00001 | VM03 | C00001 | t1 | HTTP | http://192.168.3.100/jenkins/job001 | Authorization : EdjbieDAwe == | DATA1 | Code: 200 OK Data: Start task! |
| D00002 | VM03 | C00001 | t2 | HTTP | http://192.168.3.100/jenkins/job002 | | DATA2 | Code: 401 Unauthorized Data: Authentication error. |
| .. | .. | .. | .. | .. | .. | .. | .. | .. |

PROXY RESPONSE PROGRAM, PROXY RESPONSE DEVICE AND PROXY RESPONSE METHOD

CROSS-REFERENCE TO RELATED APPLICATION

This application is based upon and claims the benefit of priority of the prior Japanese Patent Application No. 2015-153247, filed on Aug. 3, 2015, the entire contents of which are incorporated herein by reference.

FIELD

The present invention relates to a proxy response program, a proxy response device and a proxy response method.

BACKGROUND

In cloud computing, a plurality of virtual machines are provided by a virtualization base (called "hypervisor" below) on a physical machine (information processing device) in a data center, and a service system is constructed with the provided virtual machines. The terminal device of a user who is using the service system uses the service system by accessing the virtual machine via the network. A user of a cloud computing service is able to construct a desired service system by providing the needed virtual machines on physical machines, and is able to construct the desired service system flexibly, while making effective use of the hardware resources of the physical machines.

In the cloud computing, it is possible to make efficient use of the hardware of the physical machines by concentrating specific virtual machines on the physical machine, and so on, and therefore energy savings and resource savings can be made. For example, the hypervisor shares the CPU resources between a plurality of virtual machines, and changes the allocation of the CPU to a virtual machine which needs the CPU, from a virtual machine that is not using the CPU. Furthermore, with regard to the memory resources, the hypervisor releases the memory by, for instance, moving unneeded and non-urgent data in the memory, to an external storage device, and changing the allocation to a virtual machine which needs the memory.

In recent years, in order to make effective use of the limited hardware resources of physical machines, it has been proposed that resources, such as the CPU and memory, be released dynamically by suspending or temporarily halting (pausing) the virtual machines which are in an idle state. In this case, the hypervisor allocates the released CPU or memory to another virtual machine which is in an active state. When the user starts to use the virtual machine again, it is needed to resume the suspended or paused virtual machine, return the released resources to their original state and restore the virtual machine to a normal operating state. Japanese Patent Application Publication No. 2010-224914 discloses suspending and resuming a virtual machine.

Here, suspending a virtual machine involves releasing the CPU or memory, in contrast to a case such as dynamic suspension of the application or OS level, where the CPU or memory is not released.

SUMMARY

One aspect of the disclosure is a non-transitory computer-readable storage medium storing therein a proxy response program that causes a computer to execute a process including: requesting suspension or pausing of a virtual machine when an idle state of the virtual machine is detected; changing, when the virtual machine is suspended or paused, settings information of a communication control device that controls communication between a terminal device and the virtual machine, so as to transfer access from the terminal device to the virtual machine that is to be suspended or paused, to the computer; sending, when the access to the virtual machine that is suspended or paused is transferred, a response to the terminal device on the basis of communication response settings information relating to a communication response to the terminal device by the virtual machine that is suspended or paused; and requesting resumption of the virtual machine that is suspended or paused in response to the transfer of the access.

According to one aspect of the disclosure, when a virtual machine is suspended or paused, a response to access from a client terminal is provided by a proxy response program at a suitable timing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating one example of a suspended virtual machine table held by the proxy response device 24;

FIG. 9 is a diagram illustrating a concrete example of a communication response settings management table TBL4 in which the communication response settings information acquired by the proxy response device 24 has been registered;

FIG. 10 is a diagram illustrating an example of changes in the communication settings of the proxy response device;

FIG. 11 is a diagram illustrating one example of an access packet sent from a client terminal;

FIG. 13 is a diagram illustrating a concrete example of a connection information management table and proxy reception data management table.

DESCRIPTION OF EMBODIMENTS

Suspending a virtual machine is a operation which saves documents opened on the guest OS, and applications that are running, etc., precisely in their current state, to disk, and then paused the virtual machine, so that the virtual machine can be returned to its original state even if the power supply is interrupted and then restarted. Furthermore, pausing a virtual machine involves saving the documents opened on the guest OS, and applications that are running, etc., to a memory and then pausing the virtual machine, so the time needed for pausing is shorter, but the virtual machine is not able to be returned to its original state if the power supply is interrupted and then restarted. Suspending and pausing are the same in terms of releasing the memory area and CPU load. Furthermore, when the suspension or pause is cancelled, in both cases, the virtual machine restarts operation in its original state.

In the embodiments given below, suspension and pausing are described jointly as "suspension" for simplifying purpose.

There has been an increase in cases where, when constructing a Web service system with virtual machines, an application program interface (API) of the Web service system is accessed from a client terminal. Asynchronous processing is the norm of Web service APIs, and since the time-out in the event of an absence of communication response from the Web service is very short indeed (for example, approximately 3 seconds), then it is difficult for a virtual machine that has been suspended to respond appropriately to an access request transmitted to a Web service. In asynchronous processing, when a certain request is transmitted to a Web service API from a client terminal, the Web service sends back a reception response to the client terminal, in a short period of time, and executes processing in relation to the request in the background.

However, in cases where it is sought to make effective use of the hardware resources of physical machines by suspending the virtual machines constituting the Web service system when these virtual machines are in an idle state, then if the virtual machines are resumed after receiving a request from a client terminal to an API, it is sometimes not possible to respond within the short time-out period.

Figure 1:
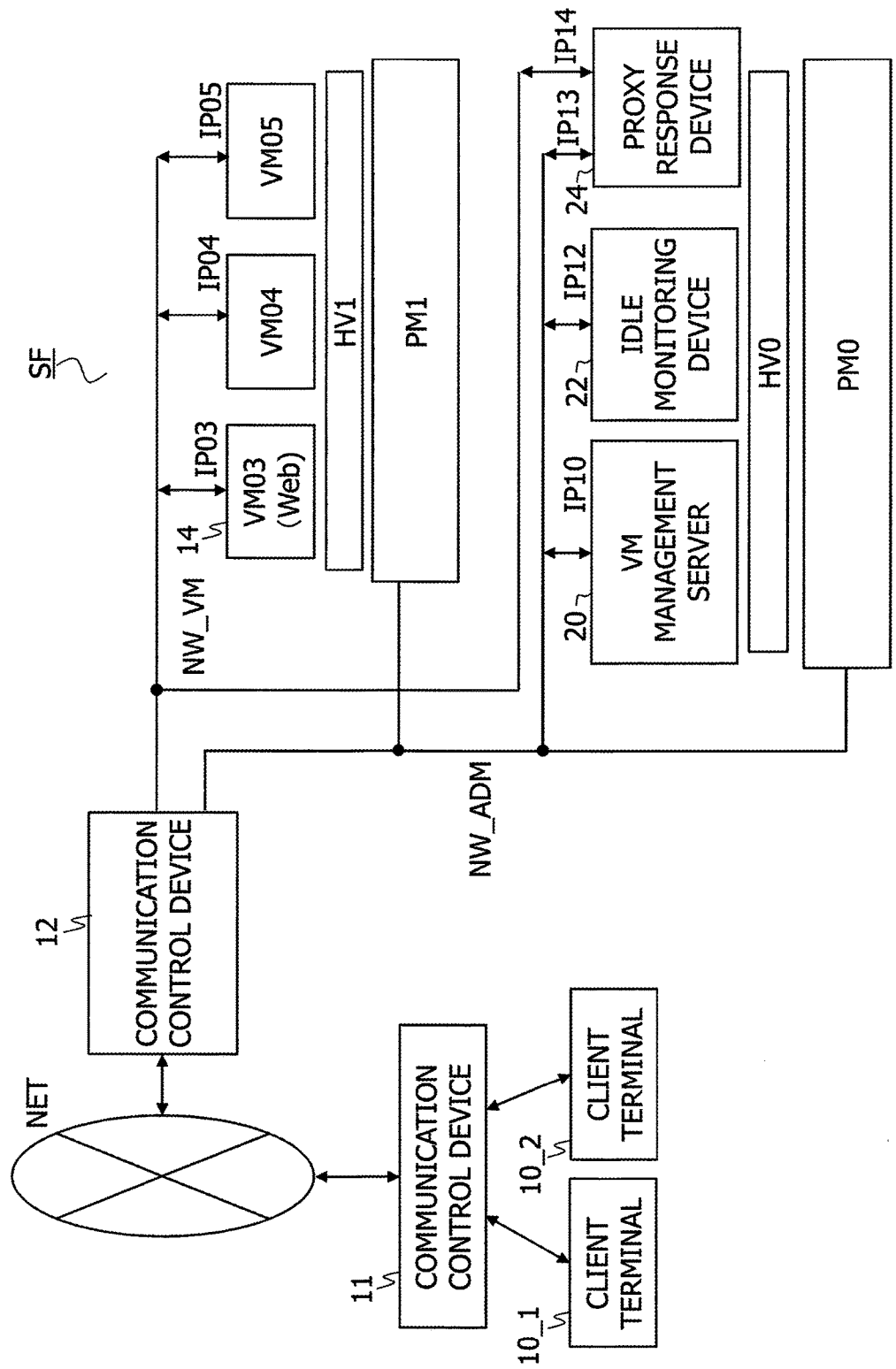
FIG. 1 is a diagram illustrating an overview of a cloud computing system having a proxy response device and a virtual machine group according to the present embodiment.

FIG. 1 is a diagram illustrating an overview of a cloud computing system having a proxy response device and a virtual machine group according to the present embodiment. A server facility SF of a cloud computing system has a plurality of virtual machines VM03, VM04, VM05 generated by a hypervisor HV1 on an information processing device PM1, which is a physical machine. A service system desired by the user is constructed with these virtual machines.

For example, in the example in FIG. 1, a Web services system is constructed with the virtual machine 14 (VM03). The physical machine PM1, although not illustrated in the drawing, includes a plurality of physical machines, and a plurality of virtual machines is generated on each of these physical machines PM1.

Furthermore, in a server facility SF, a virtual machine management server 20 which manages the virtual machines generated on the physical machines PM1, an idle monitoring device 22 which monitors whether or not the virtual machine is in an idle state, and a proxy response device 24 which provides a proxy response in lieu of a suspended virtual machine, are generated as virtual machines on the physical machine PM0, by the hypervisor HV0. The virtual machine management server, idle monitoring device and proxy response device are not necessarily virtual machines, and may also be physical machines.

The virtual machines VM03, VM04, VM05 generated on the physical machines PM1 are connected to a communication control device 12 via a virtual machine network NW_VM (called "first network" below). The first network is, for example, a LAN or VLAN. FIG. 1 illustrates examples of the IP addresses (IP03, IP04, IP05) for each of the three virtual machines VM03, VM04, VM05. Moreover, the proxy response device 24 is also connected to the first network NW_VM, and the IP address thereof is IP14, for example.

On the other hand, the virtual machine management server 20, the idle monitoring device 22 and the proxy response device 24, which are virtual machines generated on the physical machine PM0, are connected to the communication control device 12 via the management network NW_ADM (called "second network" below). The physical machines PM0, PM1 are also connected to the second network. The second network is, for example, a LAN or VLAN. FIG. 1 illustrates examples of the IP addresses (IP10, IP12, IP13) for each of the three virtual machines.

The communication control device 12 is, for example, a network switch, and for each of the first and second networks, there is an address resolution protocol (ARP) table containing correspondences between the IP address and MAC address for the virtual machines connected to the network, etc. The ARP table is one type of communication settings information which specifies the virtual machine, among the first and second networks, to which an access packet received by the communication control device is to be transferred.

The communication control device 12 is connected to a further communication control device 11 which is connected to client terminals 10_1, 10_2, for example, via a network NET, such as the Internet (for example, virtual private network (VPN)) or Intranet, etc.

The overall general operation is now described with reference to the specific examples. For instance, when the client terminal 10_1 accesses the virtual machine management server 20 and requests start up of a desired virtual machine, then the virtual machine management server 20 requests the hypervisor HV1 of the physical machines PM1 via the second network NW_AD to start up the desired virtual machine, and to cause the virtual machine VM03 to be started up, for example. This virtual machine VM03 constructs a Web service system, and runs an auto-build Web service program (e.g. Jenkins). The Web service system based on the virtual machine VM03 is set so as to receive an access request having a URL including the IP address (IP03) of the virtual machine VM03 from the client terminal.

On the other hand, a source code management program (e.g. git), for example, runs on the client terminal 10_2, and is set to call up a job execution WebAPI (Jenkins) for an auto-build Web service, when the source code for a particular program has been updated. Therefore, if the client terminal 10_2 sends the virtual machine VM03 an access for calling up a job execution WebAPI of an auto-build Web service, and the access includes the URL of the virtual machine VM03, then this access will arrive at the virtual machine VM03 via the communication control device 11, the network NET and the communication control device 12. In response to this access, the Web service program of the virtual machine VM03 executes a build job.

The virtual machine management server 20 receives monitoring information, such as operating information of the virtual machine group VM03-VM06, from the hypervisor HV1 of the physical machines PM1, via the second network NW_ADM. Furthermore, the idle monitoring device 22 determines which virtual machines are and are not in an idle state, on the basis of the monitoring information of the virtual machines, etc. gathered by the virtual machine management server 20.

The virtual machine management server 20 requests a process for suspending a virtual machine that is being monitored, of the hypervisor HV1. Conversely, the virtual machine management server 20 requests a process for resuming a virtual machine that has been suspended, of the hypervisor HV1. In accordance with these requests, the hypervisor HV1 controls the object virtual machine from an active state to a suspended state, or conversely resumes a virtual machine that is in a suspended state.

Upon receiving a request for suspending a certain virtual machine, the hypervisor HV1 withdraws the data for the target virtual machine, which is in the memory of the guest OS, and the context (register values) in the CPU, to a large-capacity storage, as a swap file, and releases the CPU and memory area of the physical machine PM1 that are allocated to the virtual machine, whereby allocation to another virtual machine is possible. As a result of this, the operation of the virtual machine that is the object of suspension is halted. This suspension of the virtual machine creates a state where the CPU or memory is released and consequently becomes available for allocation to other virtual machines, and hence differs from suspension of the guest OS on the virtual machine which is carried out while maintaining the activated state of the virtual machine.

Furthermore, upon receiving a request for resuming a designated virtual machine that has been suspended, the hypervisor HV1 starts up the target virtual machine, reserves the CPU and memory area in the physical machine PM1, loads the swap file that has been withdrawn to the storage, into the reserved memory area, and sets the swap file in the register of the CPU.

The cloud computing system in FIG. 1 is constructed in a private cloud environment. In other words, the network NET with the client terminals 10_1, 10_2 is a private network, and the client terminal 10 belongs to the same business or administrative organization as the server facility SF. Consequently, there is no risk of an attack from a client terminal, and due to demands for reduced costs, it is possible to access the group of virtual machines VM03-VM05 constituting the service system from the client terminals, directly by the IP address of the virtual machines, without routing via a device having a security function, such as a network address translation (NAT) device.

As described above, in a private cloud environment in which virtual machines are connected directly to an external network NET, the access sent from the client terminals is transmitted to the IP addresses of the virtual machines VM03-VM05, and therefore when a virtual machine is suspended, there is a risk that a communication control device 12 on the communication path will determine that communication with the virtual machine is impossible, and will discard that access.

Furthermore, consideration is given to shortening the resume processing time of the virtual machine, and in the resumption process, the hypervisor HV1 executes a process for releasing the CPU or memory area that was allocated to the virtual machine in an active state and reallocating same to the virtual machine that is the object of resumption. In this case, since the operational load of the hypervisor changes dynamically in accordance with the operational state of the virtual machine started up on the physical machine PM1, then it is difficult to predict the time period needed for this resumption process and this time period may be longer than expected. In particular, a virtual machine which can release a large amount of resources by being suspended is predicted to need, conversely, a longer resumption process.

Moreover, as stated above, in a Web service, the virtual machines carry out processing asynchronously in response to access designating an API from a client terminal, and the time-out period in the absence of a communication response is short. Consequently, if the time needed for the resumption process is longer than the time-out period, when there is access addressed to a virtual machine that has been suspended, then it is not possible to send back an initial response to the access, within the time-out period.

Therefore, in the present embodiment, a proxy response device 24 is provided. The proxy response device 24 requests suspension of a virtual machine in an idle state, to the virtual machine management server, via the second network NW_ADM, and changes the network settings in the communication control device 12 in such a manner that an access addressed to the virtual machine to be suspended arrives at the proxy response device. The proxy response device receives an access sent by the client terminal and addressed to the virtual machine that has been suspended, via the first network NW_VM, provides a proxy response to that access, and requests resumption of the virtual machine that has been suspended, of the virtual machine management server, in parallel with the proxy response. The proxy response device returns the network settings of the communication control device to the original settings, transfers data of the connection history and response history for which a proxy response has been made, to the virtual machine after resumption, and causes the Web service to be continued on the virtual machine. These operations are described in detail below. Apart from the suspension of the virtual machine described above, the present embodiment is also applied to a case where a virtual machine is paused.

Figure 2:
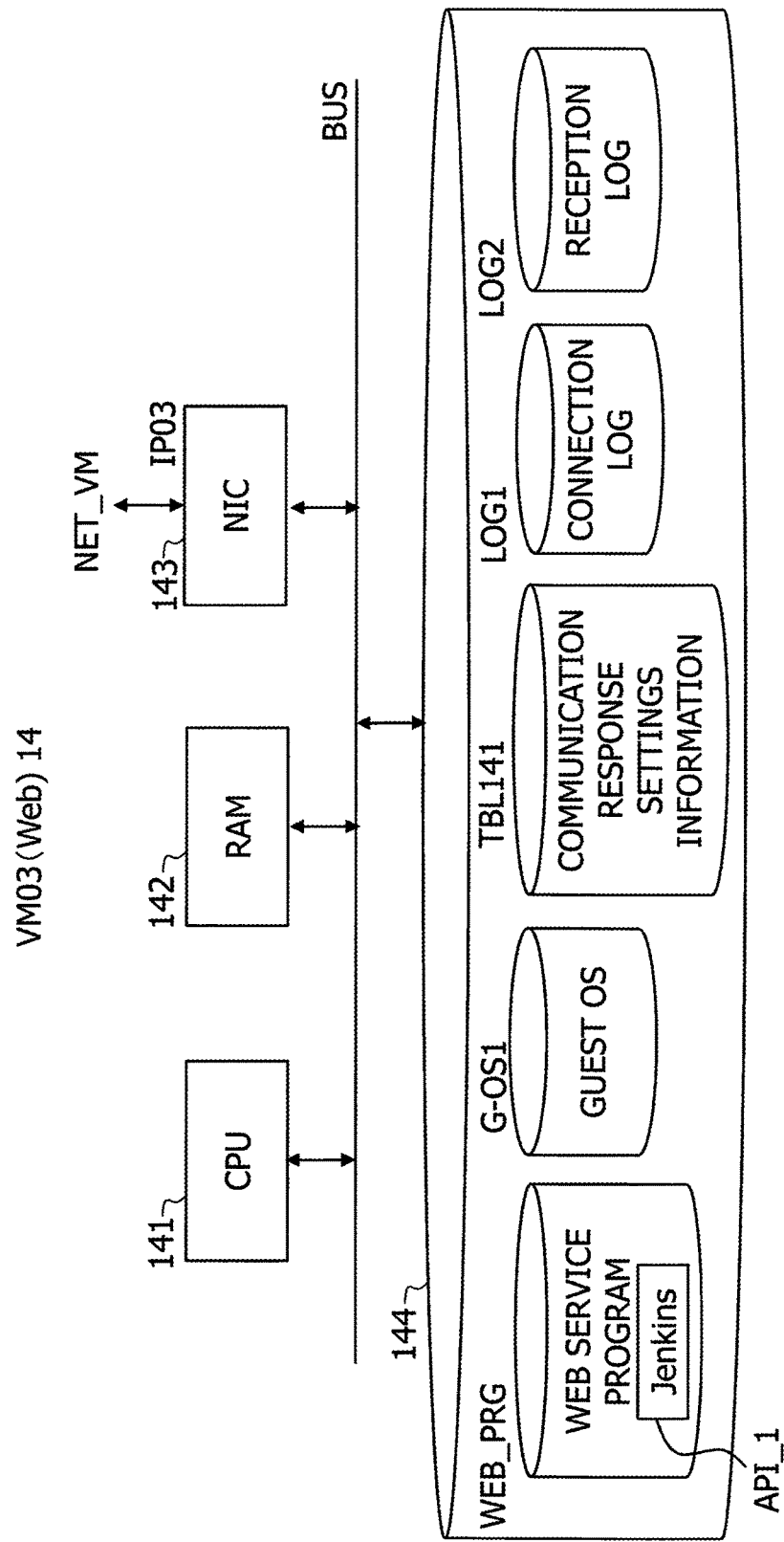
FIG. 2 is a diagram illustrating an example of the configuration of the virtual machine VM03.

FIG. 2 is a diagram illustrating an example of the configuration of the virtual machine VM03. In the present embodiment, the virtual machine VM03 constitutes a Web service system. The virtual machine VM03 includes a CPU 141, a memory 142, a network interface (NIC) 143, and a storage 144, which is an auxiliary storage device, these elements being allocated by the hypervisor HV1. The NIC 143 has an IP address of IP03, and is connected to the first network NW_VM. Stored in the storage 144 are: a Web service program WEB_PRG, a guest OS (G-OS1), various communication response settings information TBL141, a connection log LOG1, reception log LOG2, and so on.

In the case of a TCP/IP and HTTP communication protocol, the communication response settings information TBL141 includes firewall settings containing a transmission source IP address to which an access is permitted and the destination port numbers, etc. that is open, Web server settings containing URLs for which access is permitted, authentication information for which access is permitted, and application response settings (response contents to the method (a type of command) in the access), and so on.

The connection log LOG1 includes, for example, a log of all access operations to the virtual machine VM03, and the reception log LOG2 includes, for example, the request contents, and the response contents included in the accesses.

Figure 3:
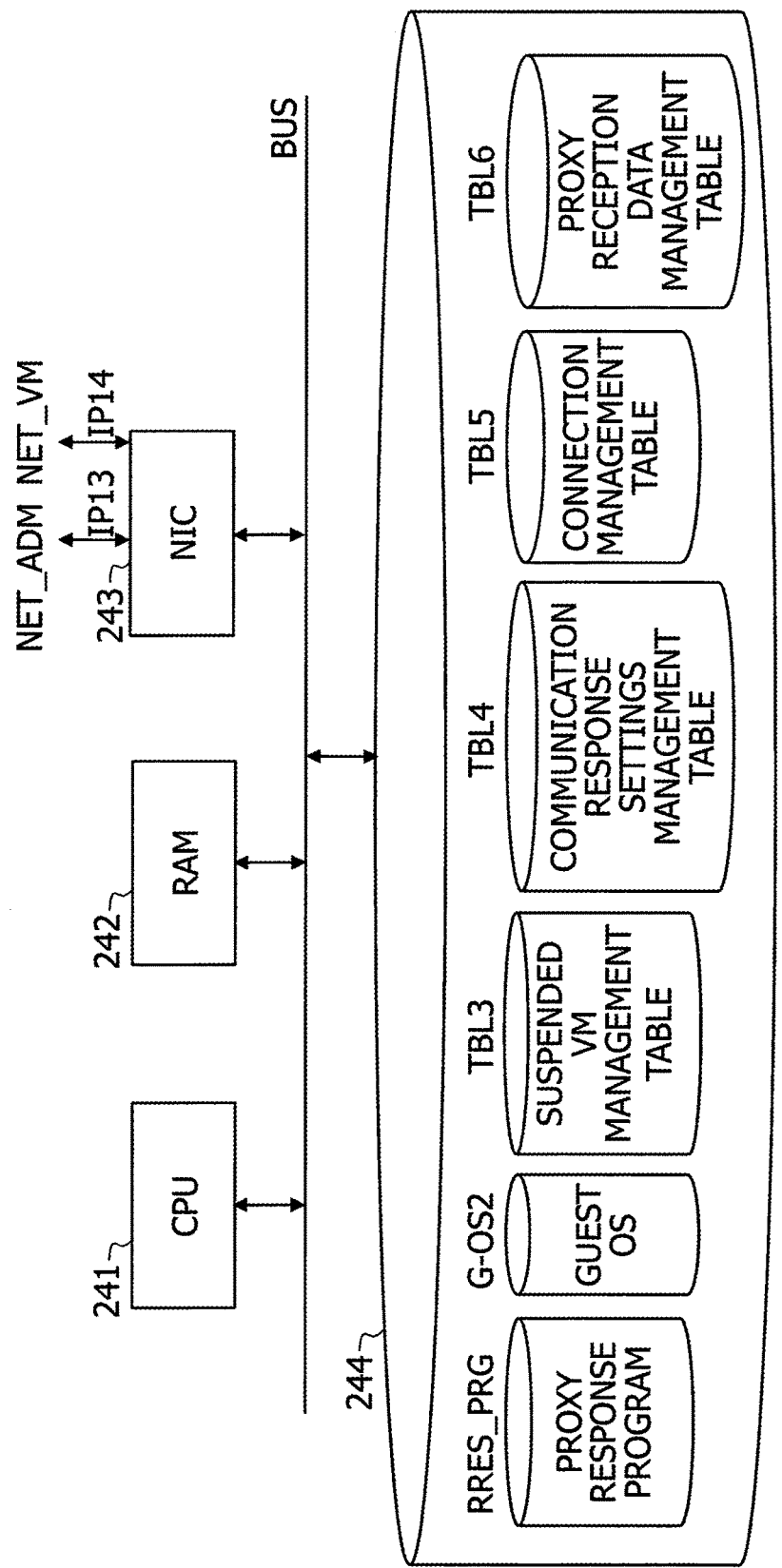
FIG. 3 is a diagram illustrating an example of the configuration of the proxy response device 24.

FIG. 3 is a diagram illustrating an example of the configuration of the proxy response device 24. The proxy response device 24 includes, for example, a CPU 241, a memory 242, a network interface (NIC) 243, and a storage 244, which are allocated by the hypervisor HV1. The NIC 243 is connected to both the first network NW_VM and the second network NW_ADM, and the respective IP addresses thereof are IP14 and IP13. A proxy response program RRES_PRG, guest OS (G-OS2), suspended virtual machine management table TBL3, communication response settings management table TBL4, connection management table TBL5, and a proxy reception data management table TBL6, and the like, are stored in the storage 244.

The proxy response program specifies the basic operation of making a proxy response to an access addressed to a virtual machine that has been suspended. The suspended virtual machine management table TBL3 stores information identifying the virtual machines that have been suspended (virtual machine ID and IP address, etc.). The communication response settings management table TBL4 stores information about the communication response settings information TBL141 acquired by the proxy response device from the virtual machine to be suspended. The connection management table TBL5 has, for example, a log of all access operations received by the proxy response device, and the proxy reception data management table TBL6 has, for example, the request contents and the response contents both included in the accesses.

Figure 4:
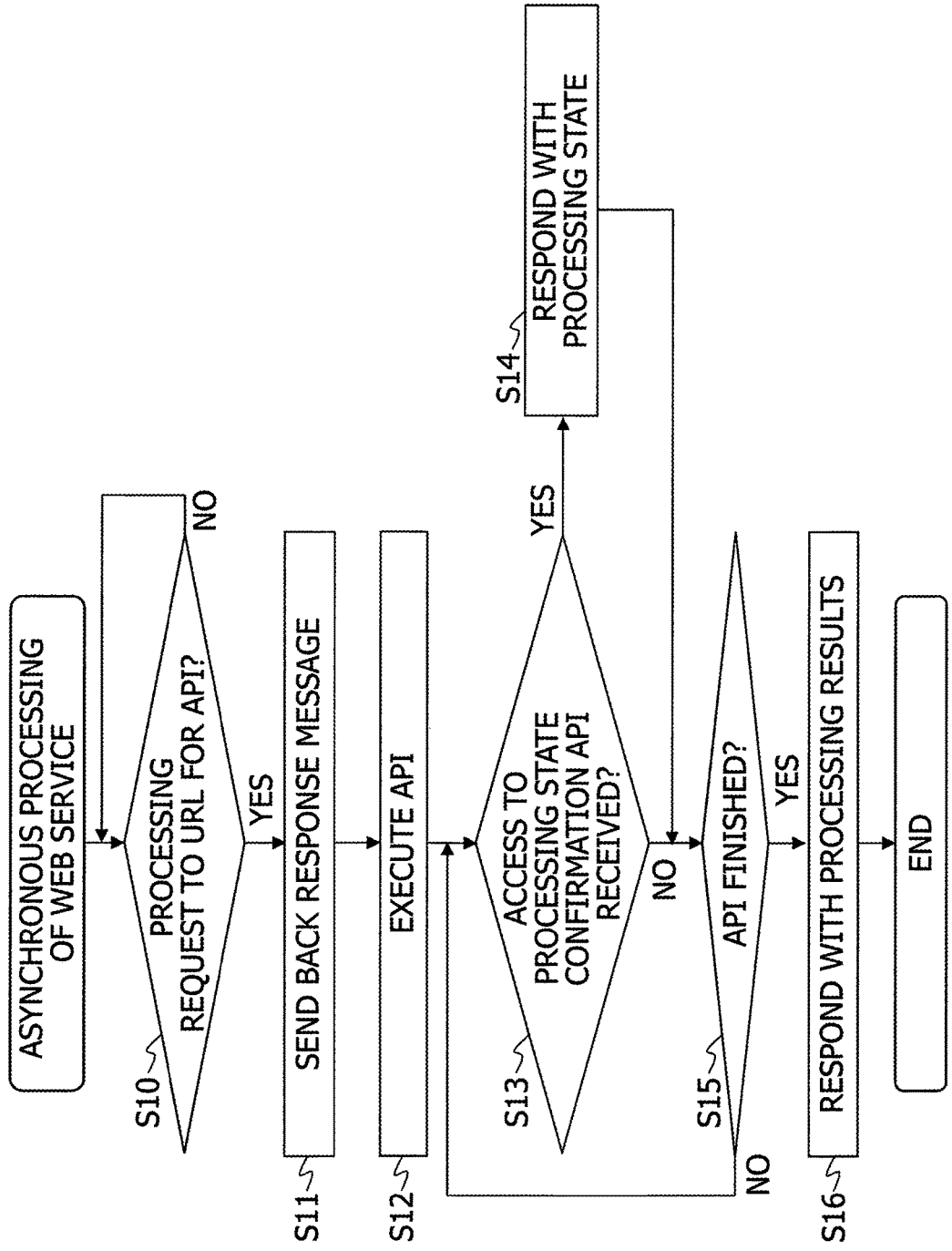
FIG. 4 is a flowchart illustrating asynchronous processing of a Web service in the virtual machine VM03.

FIG. 4 is a flowchart illustrating asynchronous processing of a Web service in the virtual machine VM03. Asynchronous processing is one function of the Web service program WEB_PRG in the virtual machine VM03. The virtual machine, upon receiving an access having a processing request to the URL for the Web service API (YES in S10), returns a response message to the client terminal which originated the access (S11). This response message is sent back within the time-out period and before the requested process has been completed. The virtual machine then executes the API (S12).

During execution of the API, if access addressed to a processing status confirmation API is received from a client terminal originating access (YES in S13), then the virtual machine VM03 sends back the current processing state (S14). When the API process has not finished (NO in S15), the processing in S13 and S14 is repeated.

When the API process has finished (YES in S15), then the virtual machine VM03 sends back the process result to the client terminal originating the access (S16).

As described below, when the virtual machine has received an access having a process request to another URL of the Web service (for example, a top display request), then the virtual machine similarly sends back a response message in a short period of time, and then sends back a response corresponding to the process request.

Overall Operation of Present Embodiment

Figure 5:
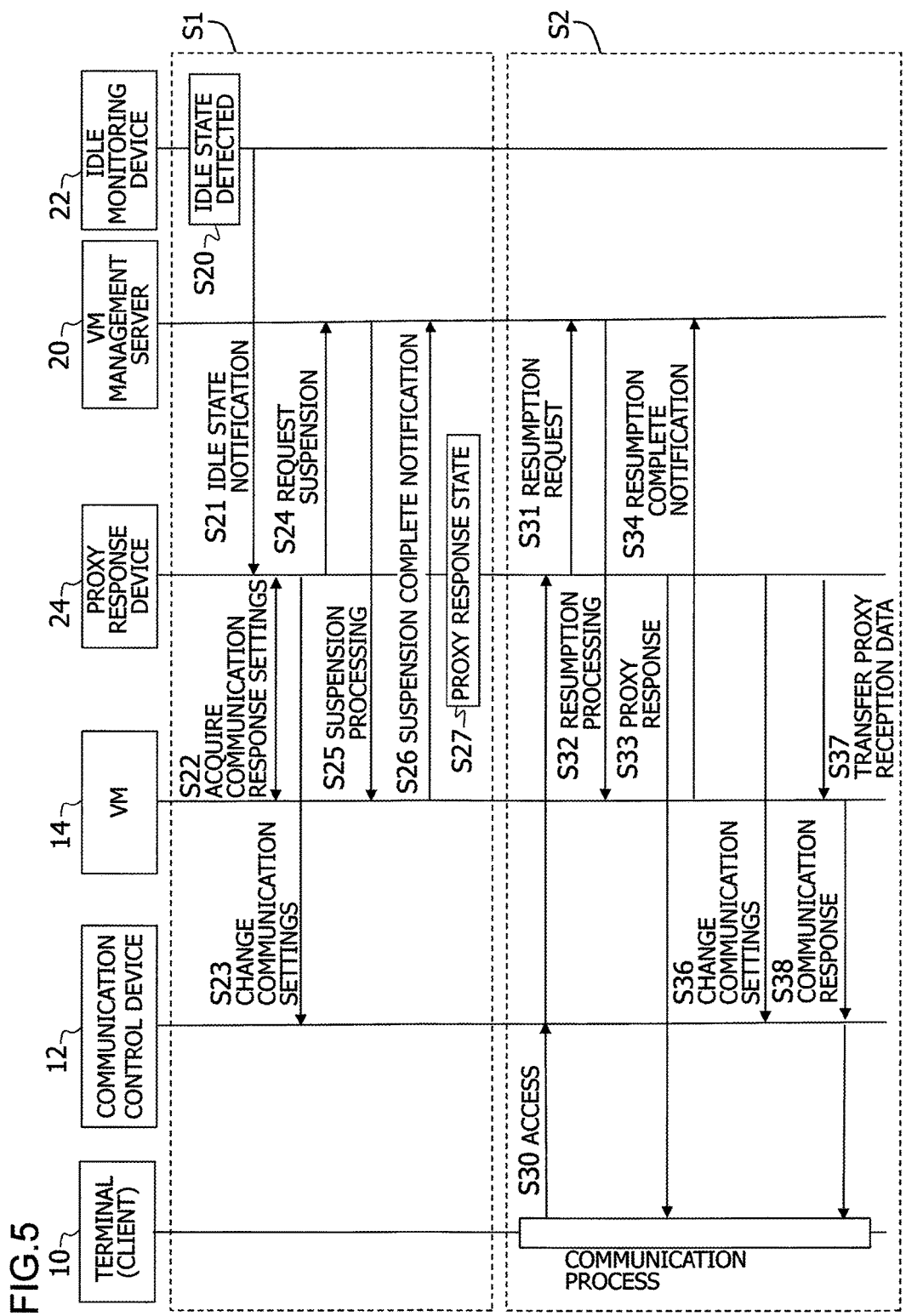
FIG. 5 is a sequence diagram illustrating a general view of the overall operation of the present embodiment.

FIG. 5 is a sequence diagram illustrating a general view of the overall operation of the present embodiment. FIG. 5 illustrates a process S1 from when the idle state detection device 22 has detected an idle state of the virtual machine 14 until the proxy response device 24 has suspended the virtual machine 14 in an idle state to enter a proxy response state, and a process S2 from when access addressed to the suspended virtual machine 14 is started until the proxy response device 24 makes a proxy response and resumption of the virtual machine 14 is completed.

[Process S1 Until Suspension and Proxy Response State]

Figure 6:
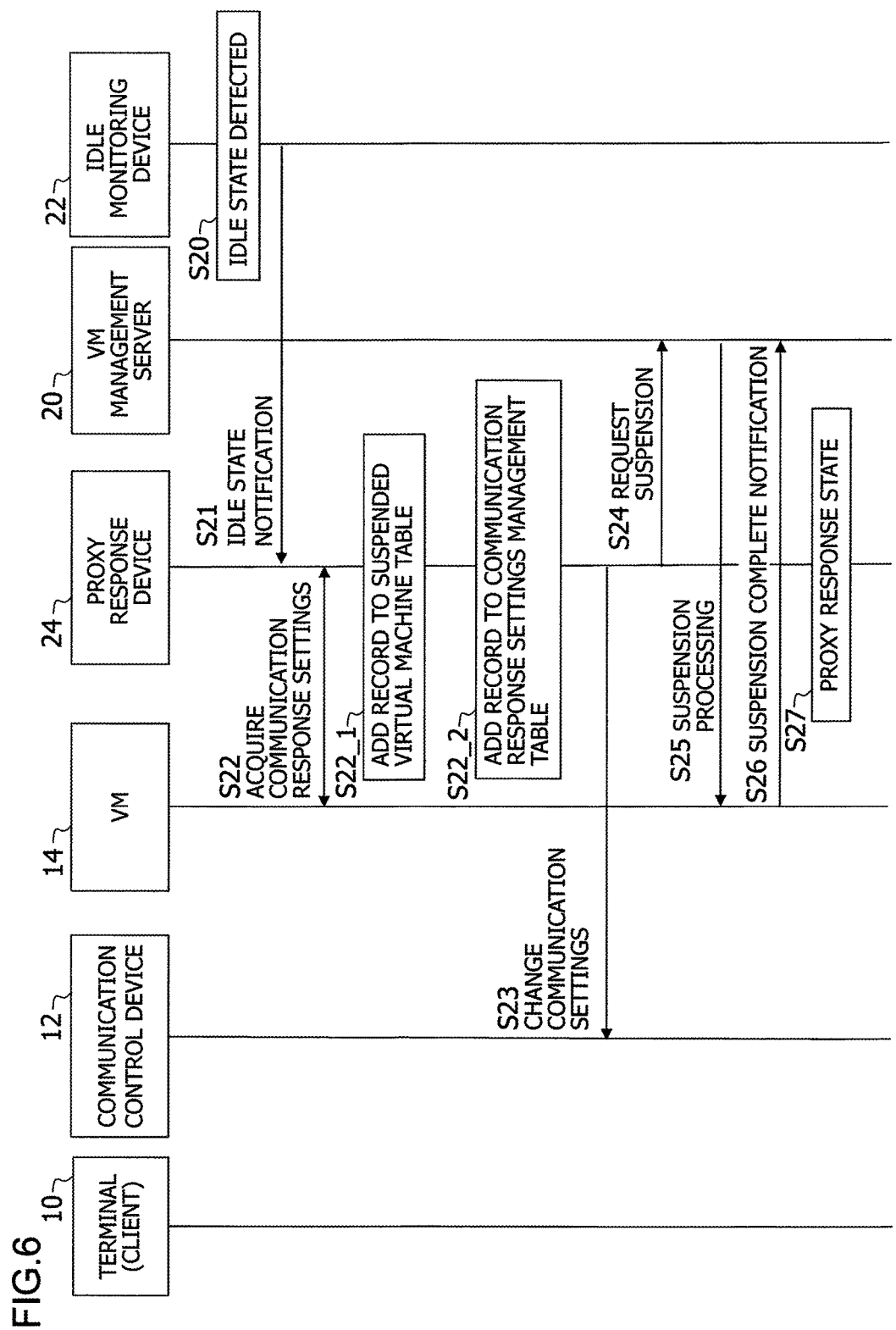
FIG. 6 is a more detailed sequence diagram of the process S1 in FIG. 5.
Figure 7:
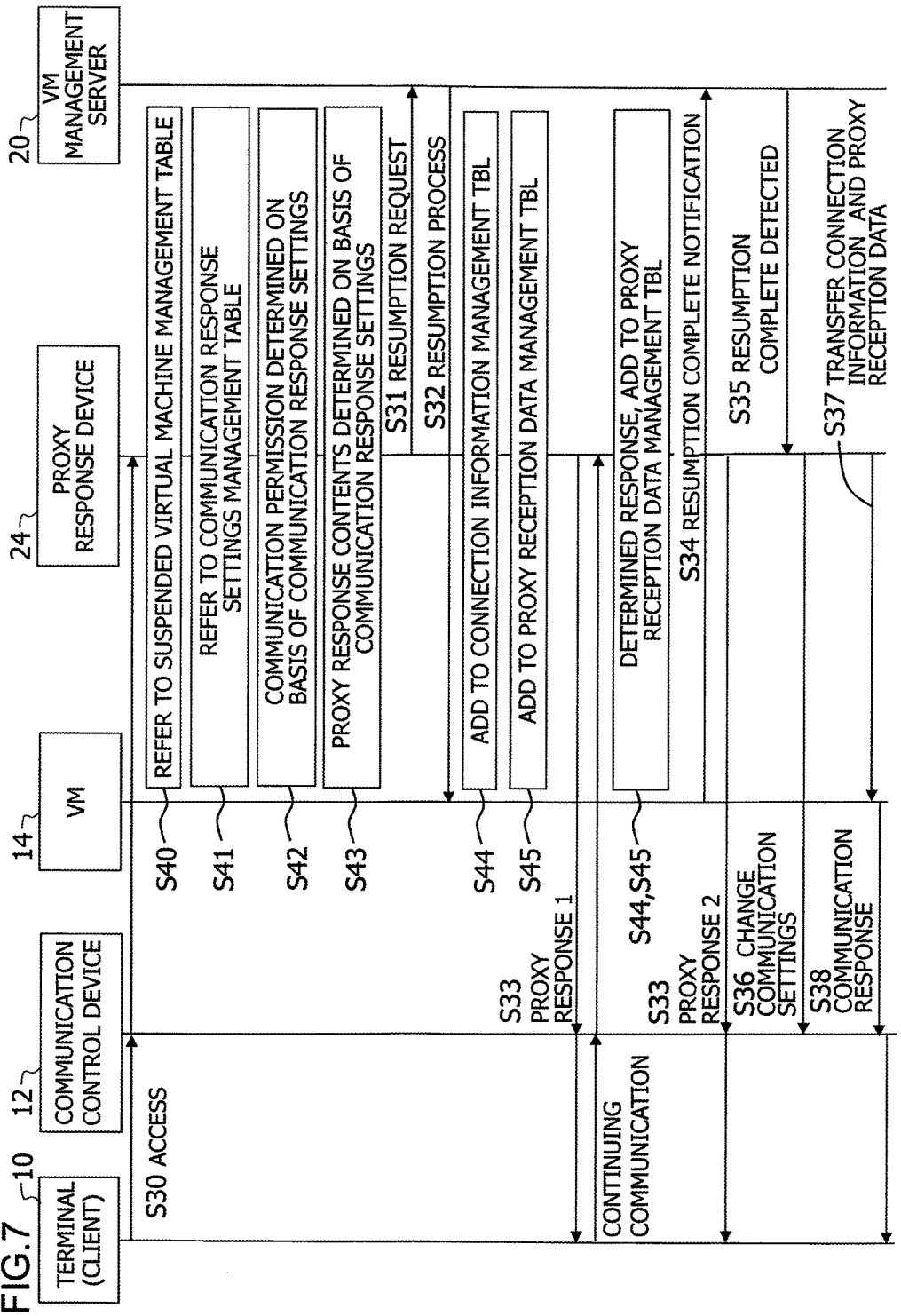
FIG. 7 is a detailed sequence diagram of the process S2 in FIG. 5.

FIG. 6 is a more detailed sequence diagram of the process S1 in FIG. 5. Furthermore, FIG. 7 is a detailed sequence diagram of the process S2 in FIG. 5. The process S1 is described below with reference to FIG. 5 and FIG. 6.

In process S1, the idle state detection device (the idle monitoring device) 22 detects a virtual machine in an idle state, on the basis of the state information of the virtual machine gathered by the virtual machine management server 20 (S20). One example of a method for determining whether or not the virtual machines VM03 to VM05 are in an idle state is described in Japanese Patent Application Publication No. 2014-191368, the disclosures of which are hereby included in the present description by reference. According to this, a monitoring purpose virtual machine which does not execute processing is started up on the same physical machine PM1, and the operational state of the monitoring purpose virtual machine (for example, the CPU usage, memory usage, data I/O volume, data transfer volume) is gathered to determine that virtual machines correlated to the operational state of the monitoring purpose virtual machine are in an idle state.

Upon detecting that a virtual machine 14 is in an idle state, the idle state detection device 22 sends a notification of the detection to the proxy response device 24 (S21). This notification includes information that uniquely identifies the virtual machine in an idle state, such as the ID and IP address of the virtual machine. In response to this, the proxy response device 24 acquires the communication response settings information for the virtual machine 14 via an agent program (not illustrated) in the virtual machine 14, over the first network NW_VM (S22).

The proxy response device 24 adds ID information for the virtual machine that has been reported to be in an idle state, to the suspended virtual machine table TBL3 illustrated in FIG. 3 (S22_1), and also adds the gathered communication response settings information as a new record of a suspended virtual machine, to the communication response settings management table TBL4 illustrated in FIG. 3 (S22_2).

FIG. 8 is a diagram illustrating one example of a suspended virtual machine table held by the proxy response device 24. FIG. 8 illustrates a virtual machine management table TBL1, an active virtual machine management table TBL2, and a suspended virtual machine management table TBL3. The virtual machine management table TBL1 is held by the virtual machine management server 20, for example. This table stores the IDs of the virtual machines (VM_ID), the respective IP addresses thereof, and the respective states thereof (active or suspended).

The active virtual machine management table TBL2 stores, for each of the virtual machines in an active state, the active virtual machine ID (active VM_ID), the virtual machine ID (VM_ID), the respective IP address, and the respective state (active or suspended). In the example in FIG. 8, it is registered that the virtual machines VM04 and VM05 are in an active state. The active virtual machine management table TBL2 is held by the virtual machine management server 20, for example.

The suspended virtual machine management table TBL3 stores, for each of the virtual machines in a suspended state, the suspended virtual machine ID (suspended VM_ID), the virtual machine ID (VM_ID), the respective IP address, and the respective state (active or suspended). In the example in FIG. 8, it is registered that the virtual machines VM03 and VM06 are in a suspended state. The suspended virtual machine management table TBL3 is held commonly by the virtual machine management server 20, the idle state detection device 22 and the proxy response device 24, for example, and is updated on the basis of idle state notifications from the idle state detection device 22.

An example of the communication response settings information for the virtual machines that is acquired from the virtual machine by the proxy response device is as indicated below, for instance. This example supposes that access to a virtual machine 14 (VM03) is made by a TCP/IP and HTTP communication protocol.

The acquired communication response settings information includes the following information:

(1) transmission source IP addresses for which access is permitted, and the open destination port numbers, which are included in the firewall settings (for example, the "/etc/sysconfi/iptables" information in Linux (registered trademark))
(2) URLs for which access is permitted, which are included in the Web server settings (the "/etc/httpd/conf" information in Linux, for instance)
(3) account information for which access is permitted (authentication information, such as ID and password), which is included in the authentication settings (the "/etc/httpd/htpasswd" information in Linux, for instance)
(4) application response settings (the "etc/jenkins/comfing.xml" information in the Jenkins program, for example).

The communication response settings described above include a connection destination IP address (IP protocol), port number (TCP protocol) and URL and account information (HTTP protocol), which is information for permitting access to the Web service of the virtual machine 14 (VM03), and also include application-level communication response settings. The information in the communications response settings differs depending on the type of protocol adopted to each application. For example, in the case of access using the ssh protocol, the communication response settings information also includes server key information, etc. which is permitted as a connection source.

Returning to FIG. 6, the proxy response device 24 adds the acquired communication response settings information to the communication response setting management table TLB4 held by the proxy response device 24, as a new record of a suspended virtual machine, in association with the suspended virtual machine in the suspended virtual machine management table (S22_2). A concrete example of the communication response setting management table is as indicated below.

FIG. 9 is a diagram illustrating a concrete example of a communication response settings management table TBL4 in which the communication response settings information acquired by the proxy response device 24 has been registered. FIG. 9 is a concrete example of the communication response settings information acquired from a virtual machine VM03 having a suspended VM_ID of "S00003".

Firstly, table TBL4 registers the ID "VM03" of the virtual machine 14 (VM03) (or the IP address "IP03" (not illustrated)), the transmission source IP addresses "IP001", "IP002" from which access is permitted, and the MAC address "MAC03". The MAC address is the MAC address set in the NIC of the virtual machine 14. Furthermore, the IP address is the access source IP information contained in the IP protocol header.

Moreover, the table TBL4 stores, as a TCP access setting, the open port number "8080". According to the TCP access settings in the table, if the port number in the TCP header of the access operation is "8080", then access is permitted, and in the case of any other port number "*", access is denied.

Furthermore, table TBL4 also stores two HTTP access settings. The first setting is a setting whereby, when the access URL is "URL1", access is permitted without authentication (Auth=None) if the connection method, which is one type of HTTP command, is "GET", and consequently, for example, the HTML file of an initial screen is sent back to the client terminal. The second setting is a setting whereby, when the requested API is "Jenkins" and the access URL is "URL2", BASIC authentication is carried out, and if the account information (authentication information) in this case is User ID="admin" and password="*****", and the connection method is "POST", then access is permitted and processing corresponding to the data "DATA2" in the connection method "POST" is executed.

According to the application settings in the table, in the case of the first setting for HTTP access, if the URL and connection method are matching, then authentication based on authentication information is omitted and the response code "200 OK" is sent back. Furthermore, in the case of the second setting, if the URL and the connection method are matching, and authentication based on authentication information is successful, then the response code "202 Accepted" is sent back. Moreover, in the case of the second setting, if the data DATA2 of the connection method "POST" is "name=job001", then the application is enabled in response to the "POST" request, and if DATA2 is "name=job002", then the application is disabled.

Returning to FIG. 5 and FIG. 6, the proxy response device 24 changes the communication settings of the communication control device 12 so that an access addressed to the virtual machine 14 is transferred to the proxy response device 24 (S23). More specifically, the proxy response device 24 changes the ARP table and routing table held by the communication control device 12.

As illustrated in FIG. 1 and FIG. 3, the NIC of the proxy response device 24 is also connected to the LAN of the virtual machine 14 (VM03) and the NW_VM. Therefore, to give a concrete example, the ARP table of the communication control device is changed as indicated below.

FIG. 10 is a diagram illustrating an example of changes in the communication settings of the proxy response device. FIG. 10 illustrates an example of an ARP table TBL10 before change and an ARP table TBL11 after change. In the ARP table before change TBL10, the MAC address "MAC03" of the virtual machine 14 (VM03) is set in respect of the IP address "IP03" of the virtual machine 14 (VM03). Consequently, the communication control device 12 appends the MAC address "MAC03" of the virtual machine 14 (VM03), to the IP packet of which the access destination is the IP address "IP03" of the virtual machine 14 (VM03), as a transmission destination MAC address, and transfers the packet to the virtual machine 14 (VM03) in the first network NET_VM. Alternatively, the communication control device 12 outputs an IP packet from the port corresponding to the MAC address "MAC03".

In the ARP table TBL11 after change, the MAC address "MAC05" of the proxy response device 24 is set in respect of the IP address "IP03" of the virtual machine 14 (VM03). Consequently, after the change, the communication control device 12 appends the MAC address "MAC05" of the proxy response device 24, to the IP packet of which the access destination is the IP address "IP03" of the virtual machine 14 (VM03), as a transmission destination MAC address, and transfers the packet to the proxy response device 24 in the first network NET_VM. Alternatively, the communication control device 12 outputs an IP packet from the port corresponding to the MAC address "MAC05".

Returning to FIG. 5 and FIG. 6, the proxy response device 24 requests the virtual machine management server 20 to suspend the virtual machine corresponding to the virtual machine ID (or IP address) in an idle state reported by the idle state notification S21 (S24). In response to this, the virtual machine management server 20 refers to the virtual machine management table TBL1, and requests the hypervisor HV1 which generated the virtual machine 14 (VM03) to suspend the virtual machine 14 (VM03) in question (S25). After suspension, the proxy response device 24 receives a suspension completion notification (S26). The suspension process is as described above.

By the foregoing, the proxy response device 24 becomes capable of making a proxy response to an access addressed to the virtual machine 14 (VM03) (S27).

[Process S2 from Proxy Response Until Completion of Resumption of Virtual Machine]

The proxy response process performed by the proxy response device and the processing until the resumption of the virtual machine 14 are described here with reference to FIG. 5 and FIG. 7.

FIG. 11 is a diagram illustrating one example of an access packet sent from a client terminal. The packet PK1 has a transmission source IP address "IP002" and transmission destination IP address "IP03" in relation to the IP protocol, and a transmission source port number "67883" and transmission destination port number "8080" in relation to the TCP protocol. Moreover, the packet PK1 has a transmission destination URL "URL1" and connection method "GET" in relation to the HTTP protocol. These are stored in the headers of the respective protocols (IP header, TCP header, HTTP header). Therefore, the packet PK1 is a packet corresponding to the first access setting, which is included in the HTTP access settings of the communication response settings management table TBL4 in FIG. 9.

The packet PK2 has the same information as packet PK1 in relation to the IP protocol and TCP protocol, and has the information: transmission destination URL "URL2/Jenkins", authentication type "BASIC", authentication information (account information) "User=Admin, PW=*****", and connection method "POST", in relation to the HTTP protocol. Moreover, packet PK2 also has the data "DATA2 (job001)" which is attached to the connection method "POST". The packet PK2 is a packet corresponding to the second access setting, which is included in the HTTP access settings in the communication response settings management table TBL4 in FIG. 9.

Returning to FIG. 5 and FIG. 6, the client terminal 10 starts access addressed to the Web service of the virtual machine 14 (VM03) (S30). This access involves the packet illustrated in FIG. 11, for example. Since the transmission destination IP address of this access packet is "IP03", then the communication control device 12 refers to the ARP table TBL11 held in the communication control device 12, and transfers the packet to the MAC address "MAC05" registered in correspondence with the IP address "IP03", via the first network NW_VM.

The proxy response device 24 determines whether or not the received access is permitted to make a connection, and determines what kind of response message is to be sent back if connection is permitted.

Figure 12:
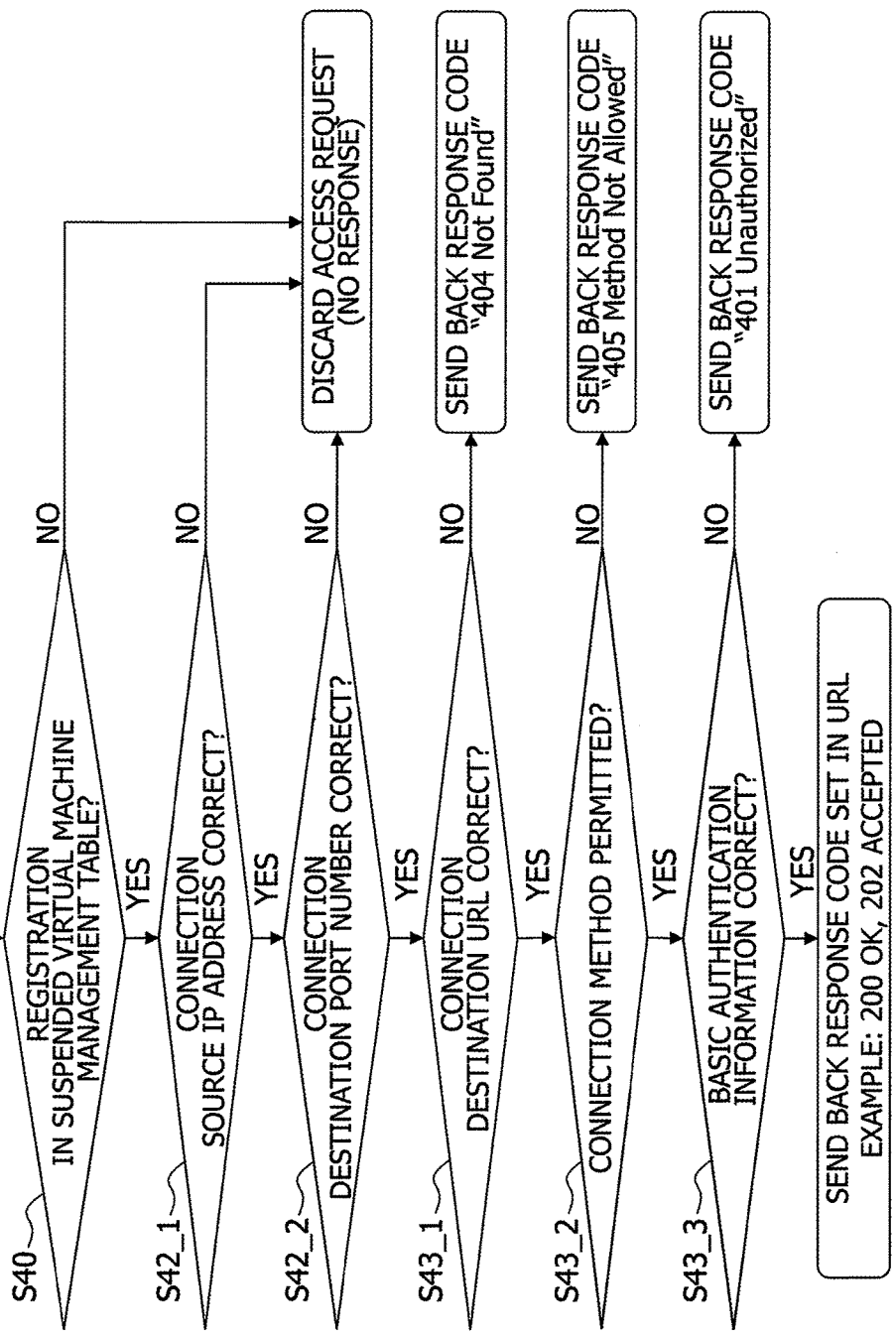
FIG. 12 is a flowchart diagram illustrating the processing of the proxy response device in relation to access from the client terminal.

FIG. 12 is a flowchart diagram illustrating the processing of the proxy response device in relation to access from the client terminal. The step numbers in FIG. 12 indicate the processes corresponding to the steps S40, S42, S43 in FIG. 7.

The proxy response device 24, in response to receiving the access packet sent from the client terminal, refers to the suspended virtual machine management table TBL3 in FIG. 8, and confirms whether the virtual machine corresponding to the IP address "IP03" is registered as a suspended virtual machine, on the basis of the transmission destination IP address "IP03" in the packet (S40). If the virtual machine is not present in the table (NO in S40), then the access start request is discarded. If the virtual machine has been registered, then it is confirmed that the access is addressed to a virtual machine 14 (VM03) that is in a suspended state.

Next, the proxy response device 24 refers to the communication response settings management table TBL4 which is held in the proxy response device 24 (S41). Moreover, the proxy response device 24 determines whether or not communication of the access which has been received by proxy is permitted, on the basis of communication response settings management table TBL4 (S42). More specifically, as illustrated in FIG. 12, it is determined whether or not the transmission source IP address in the reception packet matches an IP address for which access is permitted in the communication response settings management table TBL4 (in FIG. 9, IP001, IP002) (S42_1). If the IP address is matching, then it is confirmed that the connection destination IP address is correct.

Moreover, as illustrated in FIG. 12, it is determined whether or not the connection destination port number in the reception packet matches the port number "8080" in the TCP access setting in the communication response settings management table TBL4 (S42_2). If the port number is matching, then it is confirmed that the connection destination port number is correct. If any item is not matching, then the access request is not correct and therefore the packet in the access request is, for example, discarded, and no response is made. Thus far, it has been determined whether or not the access request is permitted, on the basis of a TCP/IP protocol.

If it is determined that the access request received by proxy is permitted (S42), then the proxy response device 24 subsequently determines what kind of response message is to be sent back in relation to the access request, on the basis of the communication response settings table TBL4 (S43). This determination of the response contents in S43 is carried out on the basis of the HTTP protocol.

More specifically, as illustrated in FIG. 12, the proxy response device 24 determines whether or not the connection destination URL in the HTTP header of the reception packet matches a connection destination URL in the HTTP access settings in the communication response settings management table TBL4 (S43_1). If the URL is matching, then it is confirmed that the connection destination URL is correct (YES in S43_1). If the URL is not matching, then it is confirmed that the connection destination URL is incorrect (NO in S43_1). In this case, the response code "404 Not Found" is determined as the response contents, and this response is sent back.

Moreover, the proxy response device 24 determines whether or not the connection method in the HTTP header of the reception packet matches the connection method corresponding to the connection destination URL in the HTTP access settings in the communication response settings management table TBL3 (S43_2). For example, in the case of the reception packet PK1 in FIG. 11, the URL is "URL1" and the connection method is "GET", and since the connection method corresponding to "URL1" in the first settings in the communication response settings management table TBL4 is also "GET", then it is determined that the connection method is matching. Similar determination judgments are also carried out in the case of the reception packet PK2 in FIG. 11. If the method is not matching (NO in S43_2), then the response code "405 Method Not Allowed" is determined as the response contents, and this response is sent back.

Furthermore, the proxy response device 24 also determines whether or not the authentication information is correct (S43_3). For example, in the case of the reception packet PK2 in FIG. 11, it is determined that the authentication type "BASIC" and the authentication information "User=Admin, PW=***" match the authentication type "BASIC" and the authentication information "User=Admin, PW=***" in the second setting of the HTTP access settings in the communication response settings management table TBL3. The reception packet PK1, on the other hand, does not include an authentication type or authentication information, but since there is no authentication setting in the first setting of the HTTP access settings in the management table TBL3, then the authentication information is determined to be matching. If the authentication information is not matching (NO in S43_3), then the response code "401 Unauthorized" is determined as the response contents, and this response is sent back.

If the authentication information is also correct (YES in S43_3), then the proxy response device 24 determines either one of the response codes "200 OK" or "202 Accepted" set in the application settings in the communication response settings management table TBL4 as a response code corresponding to the URL of the access request, in the response contents, and sends back this response.

The three response codes in the case where the access request is not correct in the description given above correspond to "404 Not Found" in cases where there is no resource at the URL requested by the packet, "405 Method Not Allowed" in cases where the method is not permitted, and "401 Unauthorized" in cases where authentication is not correct, these codes being defined respectively by the HTTP status code. Therefore, the proxy response device 24 is able to determine which response code to use in the response, without referring to the management table TBL3.

On the other hand, with regard to the two response codes when the access request is correct, either the code "200 OK" in the case of the first setting of the HTTP access settings, or the code "202 Accepted" in the case of the second setting, is determined respectively on the basis of the reception response setting management table TBL4. In the first setting, the connection destination URL is set only to "URL1", and the access is not addressed to an API. On the other hand, in the second setting, the connection destination URL is "URL2/Jenkins", and the access is addressed to an API. Even if the access is not addressed to an API as in the first settings, a response code may still be returned in a short time, by asynchronous processing.

The proxy response device 24 only refers to the communication response settings management table TBL4 to compare with the contents of the reception packet, and is able to send back these response codes within a short time-out period. These response codes are an initial response that is sent back by the proxy response device. In the event that the response contents are not able to be determined, the proxy response device 24 may send back a retransmission request (retry request), or the like.

Returning to FIG. 7, if the proxy response device 24 determines that the access request is appropriate and returns the response code "200 OK" or "202 Accepted", then it is needed to carry out the processing requested by the access to return the needed response. The proxy response device 24 is not able to carry out the processing requested by the access.

Therefore, in order to resume the virtual machine that has been suspended, and to end the proxy response, the proxy response device 24 sends a resumption request for the suspended virtual machine 14 (VM03) that is the access destination, to the virtual machine management server 20 (S31). In response to this, the virtual machine management server 20 requests a resumption process for the virtual machine 14 (VM03), of the hypervisor HV1 of the physical machines PM1 (S32).

The proxy response device 24 then registers the connection based on the access request, in a connection information management table held by the proxy response device 24 (S44). The connection information management table stores a log of all connections received by proxy by the proxy response device in lieu of a suspended virtual machine. Furthermore, the proxy response device 24 also registers a proxy reception log including the proxy reception contents and the response contents, in a proxy reception data management table held by the proxy response device 24 (S45).

In the example in FIG. 7, a proxy response is sent back to the client terminal with the response contents determined by the proxy response device 24 (S33). Moreover, when an access occurs continuously from the client terminal, then the proxy response device 24 determines a response corresponding to that access, registers the proxy reception contents in the proxy reception data management table (S44, S45), and sends back the proxy response again (S33).

In this, when the virtual machine management server 20 receives notification from the hypervisor HV1 that the resumption of the virtual machine 14 (VM03) has been completed (S34), then the virtual machine management server 20 sends a resumption completion notification to the proxy response device 24 (S35). In response to this, the proxy response device 24 requests a change in communication settings, of the communication control device 12 (S36). The communication control device 12 changes the ARP table from TBL11 to TBL10 in FIG. 10, by rewriting the MAC address corresponding to the IP address "IP03" in the ARP table, from the address "MAC05" of the proxy response device to the address "MAC03" of the virtual machine 14 (VM03). Moreover, the proxy response device 24 transfers information from the connection information management table TBL5 and the proxy reception data management table TBL6, to the resumed virtual machine 14 (VM03) (S37), and the virtual machine stores this information.

As a result of this, the communication control device transfers subsequent access requests addressed to the IP address "IP03", to the virtual machine 14 (VM03) that has been resumed. Furthermore, the virtual machine 14 (VM03), by referring to the connection information and proxy reception data, executes processing in relation to the pending access request and sends back the processing result to the client terminal that originated the access request (S38). For example, the virtual machine 14 sends back the HTML file of an initial screen, in relation to an access request addressed to the URL1 in the first setting of the HTTP access settings, and executes a Jenkins API and responds with the execution result, in relation to an access request addressed to the URL2/Jenkins in the second setting.

Upon receiving an access, the proxy response device 24 may refer to the suspended virtual machine management table and, upon confirming that the virtual machine of the access destination is suspended (S40), may send a resume request for that virtual machine to the virtual machine management server 20. Thereby, the resumption process of the virtual machine can be started even earlier.

FIG. 13 is a diagram illustrating a concrete example of a connection information management table and proxy reception data management table. In the example of the connection information management table TBL5, a connection log is recorded for each connection ID (for instance, each session ID), the connection log containing: the destination virtual machine ID, the transmission source IP address, the transmission destination IP address, the transmission source port number, the transmission destination port number, the protocol type of the transport layer, the connection state (disconnected or receiving), the response state (responded, not responded), and so on. In according with the response state, the virtual machine 14 detects which connections are not yet responded, and determines a response content for the access and issues a response.

In the example of the proxy reception data management table TBL6, a log is recorded for each connection ID, the log containing proxy reception data, such as the reception data ID, destination virtual machine ID, reception timing, protocol type of the application layer, URL, authentication data, reception data, and response data, etc., and the response contents corresponding to same. In accordance with this response data, the virtual machine 14 determines which process of the access request to restart and which process result to send as a response, and can then restart the process.

As described above, according to the present embodiment, in cloud computing in which a plurality of virtual machines are started up on a physical machine and a service system is constructed from the virtual machines, when a virtual machine of the service system which receives an access request from a plurality of client terminals is in an idle state, then that virtual machine is suspended and the CPU or memory resources of that virtual machine are released. In the case of receiving an access request generated during suspension, the proxy response device receives the access request, carries out asynchronous processing, and sends back an initial response in a short period of time. Therefore, the occurrence of a time-out in respect of an access request is suppressed, and even if the virtual machine executes the API of the access request after resuming, there is no distinction from a normal response operation on the client terminal side.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein a proxy response program that causes a computer to execute a process comprising:
   requesting suspension or pausing of a virtual machine when an idle state of the virtual machine is detected;
   changing, when the virtual machine is suspended or paused, settings information of a communication control device that controls communication between a terminal device and the virtual machine, so as to transfer access from the terminal device to the virtual machine that is to be suspended or paused, to the computer;
   sending, when the access to the virtual machine that is suspended or paused is transferred, a response to the terminal device on the basis of communication response settings information relating to a communication response to the terminal device by the virtual machine that is suspended or paused; and
   requesting resumption of the virtual machine that is suspended or paused in response to the transfer of the access.

2. The proxy response program according to claim 1, the process further comprising:
   confirming, when the access to the virtual machine that is suspended or paused is transferred, whether or not the transferred access is permitted on the basis of the communication response settings information, and recording connection data including transmission source information and transmission destination information of the transferred access.

3. The proxy response program according to claim 2, the process further comprising:
   identifying, when the access to the virtual machine that is suspended or paused is transferred, response contents relating to the transferred access on the basis of the communication response settings information, and recording reception data of the transferred access and response data to the terminal device corresponding to the reception data.

4. The proxy response program according to claim 3, the process further comprising:
   when the resumption of the virtual machine is completed, returning the settings information of the communication control device to the state before change; and
   sending the recorded connection data, reception data and response data, to the virtual machine that completes resuming.

5. The proxy response program according to claim 1, the process further comprising:
   acquiring the communication response settings information from the virtual machine, when the virtual machine is suspended or paused.

6. The proxy response program according to claim 1, wherein
   changing the settings information of the communication control device includes changing correspondence information of a first MAC address of the virtual machine and a first IP address of the virtual machine, to correspondence information of a second MAC address of the computer and the first IP address of the virtual machine.

7. The proxy response program according to claim 1, wherein
   suspending or pausing the virtual machine includes saving a guest operating system of the virtual machine from a memory of a physical machine on which the virtual machine is constructed, and releasing the memory and a processor of the physical machine allocated to the virtual machine.

8. The proxy response program according to claim 1, wherein
   the virtual machine and the terminal device belong to the same business or organization.

9. The proxy response program according to claim 1, the process further comprising:
   transmitting a response to the terminal device by asynchronous processing.

10. A method for a proxy response by a computer, the method comprising:
    requesting suspension or pausing of a virtual machine when an idle state of the virtual machine is detected;
    changing, when the virtual machine is suspended or paused, settings information of a communication control device that controls communication between a terminal device and the virtual machine, so as to transfer access from the terminal device to the virtual machine that is to be suspended or paused, to the computer;

sending, when the access to the virtual machine that is suspended or paused is transferred, a response to the terminal device on the basis of communication response settings information relating to a communication response to the terminal device by the virtual machine that is suspended or paused; and requesting resumption of the virtual machine that is suspended or paused in response to the transfer of the access.

11. A proxy response device comprising:

a memory; and a processor that executes a process including:

requesting suspension or pausing of a virtual machine when an idle state of the virtual machine is detected;

changing, when the virtual machine is suspended or paused, settings information of a communication control device that controls communication between a terminal device and the virtual machine, so as to transfer access from the terminal device to the virtual machine that is to be suspended or paused, to the proxy response device;

sending, when the access to the virtual machine that is suspended or paused is transferred, a response to the terminal device on the basis of communication response settings information relating to a communication response to the terminal device by the virtual machine that is suspended or paused; and requesting resumption of the virtual machine that is suspended or paused in response to the transfer of the access.

* * * * *